(12) United States Patent
Gälliner et al.

(10) Patent No.: US 6,238,070 B1
(45) Date of Patent: May 29, 2001

(54) HEADLIGHT ARRANGEMENT

(76) Inventors: Lennart Gälliner, Bjarme 210 S-830 22, Faker; Ove Olsson, Artvagen 50 S-831 62, Ostersund, both of (SE)

( * ) Notice: Subject to any disclaimer, the term of this patent is extended or adjusted under 35 U.S.C. 154(b) by 0 days.

(21) Appl. No.: 09/308,720

(22) PCT Filed: Nov. 24, 1997

(86) PCT No.: PCT/SE97/01972

§ 371 Date: Jul. 2, 1999

§ 102(e) Date: Jul. 2, 1999

(87) PCT Pub. No.: WO98/22308

PCT Pub. Date: May 28, 1998

(30) Foreign Application Priority Data

Nov. 22, 1996 (SE) .................................................. 9604293

(51) Int. Cl.$^7$ .............................. B60Q 1/02; F21V 19/00
(52) U.S. Cl. ..................... 362/505; 362/496; 362/543; 362/549; 362/249
(58) Field of Search ..................... 362/486, 496, 362/502, 505–507, 543, 544, 549, 249

(56) References Cited

U.S. PATENT DOCUMENTS

| 1,429,173 | * | 9/1922 | Stern | 362/502 |
| 2,675,983 | * | 4/1954 | King | 362/486 |
| 3,590,236 | * | 6/1971 | Ussery | 362/486 |
| 3,633,020 | * | 1/1972 | Macadam | 362/505 |
| 4,466,646 | * | 8/1984 | Delmastro et al. | 362/505 |
| 4,636,921 | * | 1/1987 | Vollrath | 362/549 |
| 5,010,456 | * | 4/1991 | Reichman et al. | 362/549 |

* cited by examiner

*Primary Examiner*—Alan Cariaso
(74) *Attorney, Agent, or Firm*—John Lezdey & Assoc.

(57) ABSTRACT

The present invention provides an arrangement with special lights for a vehicle which has a stage with at least two headlights. The arrangement is to be fastened to the front portion of the vehicle and contains two types of holders. One of the holders is in the form of a quick connect and a part which projects outside the radiator grill. Accordingly, the arrangement can be mounted and dismounted from the vehicle.

5 Claims, 3 Drawing Sheets

HEADLIGHT ARRANGEMENT

FIELD OF THE INVENTION

This invention relates to an arrangement with special lights for a vehicle, comprising a stage which is provided with at least two headlights, and which is intended to be fastened to the front portion of the vehicle, the vehicle preferably having a bumper and a bonnet with an integrated radiator grill.

BACKGROUND OF THE INVENTION

This type of arrangement with special lights is very common on vehicles today, especially during the dark season. A problem with the arrangement is that it has become especially liable to be stolen. This problem could of course be solved if the arrangement could easily be loosened and be taken indoors for storage during the night by the owner. This can not be simply done with arrangements with special lights, known in the market, and therefore the arrangement with special lights is allowed to be remained on the vehicle.

Another problem that has arisen during later years is that many of the most popular car models have bonnets with an integrated radiator grill. This means that the radiator grill of the modern cars cannot be a stationary fastening point for the arrangement with special lights in that way it was on cars of older model.

SUMMARY OF THE INVENTION

This invention intends to solve these two problems and to provide a technical solution that allows not only a simple demounting of the arrangement with special lights but also allows a simple and stable mounting on that type of private cars which are provided with a radiator grill integrated with the bonnet. This has been made possible by an arrangement of the kind mentioned by way of introduction which has the combination of the following features:

The arrangement comprises a first type of holding means, which is intended to be fastened to the front portion of the vehicle, for instance on the bumper of the vehicle or on a cross-beam arranged in connection to the bumper;

The arrangement comprises a second type of holding means in the form of quick coupling means, which has two main parts being able to be connected to each other, the one main part being articulately fastened on the headlights and/or the stage, and the other main part, co-operating with the first one, projecting outside the radiator grill and being fastened to the same, alternatively on the inside of the bonnet;

All headlights are electrically interconnected to the first part of an electric coupling means, the second part of which, which is intended to be connected with the first part, is connected to the electric system of the vehicle and accordingly stationarily arranged in the vehicle.

BRIEF DESCRIPTION OF THE DRAWINGS

A preferred embodiment of the invention shall be described more closely below with reference to the accompanying drawings, where.

DESCRIPTION OF THE PREFERRED EMBODIMENTS

Figure 1:
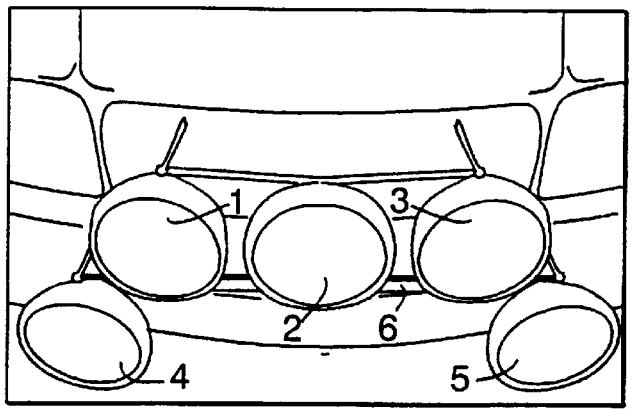
FIG. 1 shows an arrangement with special lights mounted at the front of a private car.
Figure 2:
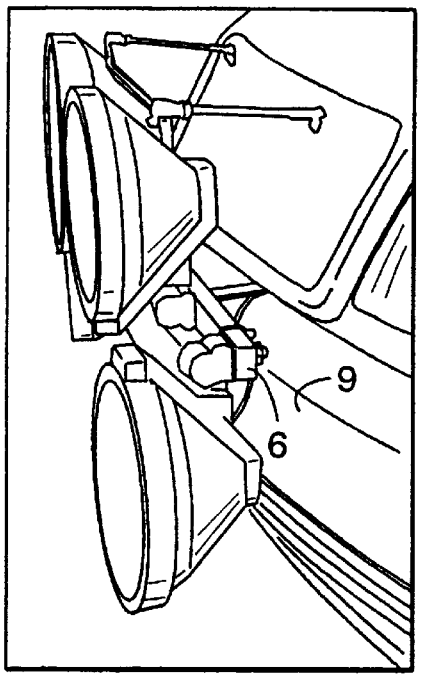
FIG. 2 shows the arrangement, seen in the direction of the arrows II—II in FIG. 1.

With reference to FIGS. 1, 2 is shown there an arrangement with special lights comprising five headlights 1–5, all of which are mounted on a stage 6. This stage comprises two rods 7, 8 at its lower part (see FIG. 3), which are intended to be mounted on the bumper 9 of the car, alternatively on a cross-beam 10, arranged in connection to this bumper, by means of conventional screw means 30 (see FIG. 6).

Figure 4:
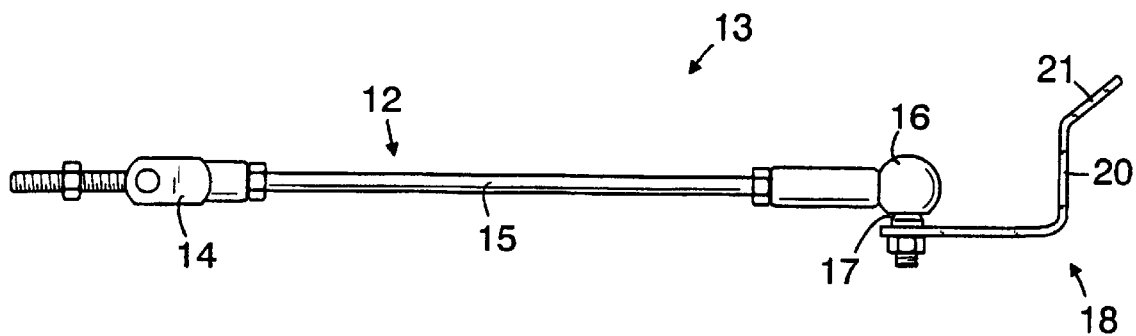
FIG. 4 shows a quick coupling means in the form of two main parts, demountable from each other, for fastening of the arrangement to the radiator grill/bonnet of the car.
Figure 5:
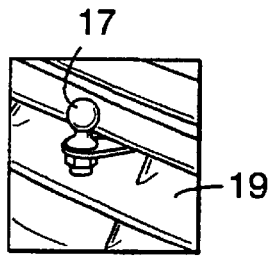
FIG. 5 shows one of the main parts, projecting out through the radiator grill of the car.

As is apparent from the drawing three headlights 1–3 are positioned at essentially the same level and above the two remaining headlights 4, 5. At the top side of these three headlights 1–3 is an essentially horizontal rod 11 fastened. At each one of the two end portions of this rod is the first main part 12 of a quick coupling means 13 (see FIG. 4) arranged. This main part 12 comprises a portion 14, which is possible to articulate and which is pivotally fastened on the rod 11, a rod part 15 and at the very end of this rod part a socket means 16, which is intended to be able to be detachably connected with a ball coupling 17, which is arranged on the second main part 18 of the quick coupling means 13. As appears from FIG. 5 the second main part 18 projects outside the radiator grill 19 of the car, the ball coupling 17 of this main part becoming easily accessible for connection with the socket means 16 of the first main part 12.

The second main part 18, which besides the ball coupling 17 also comprises an arm 20, is intended either to be fastened directly on the radiator grill 19 of the bonnet or still more suitable on the inside of the bonnet in connection to the radiator grill. The outer portion 21 of the arm 20 is securely fastened on the inside if the bonnet by screws.

Figure 3:
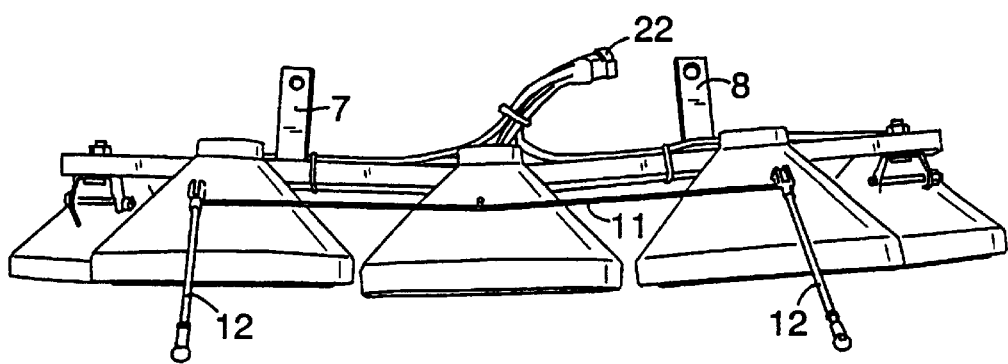
FIG. 3 shows a picture straightly from above of the arrangement according to FIG. 1 but in demounted condition.
Figure 6:
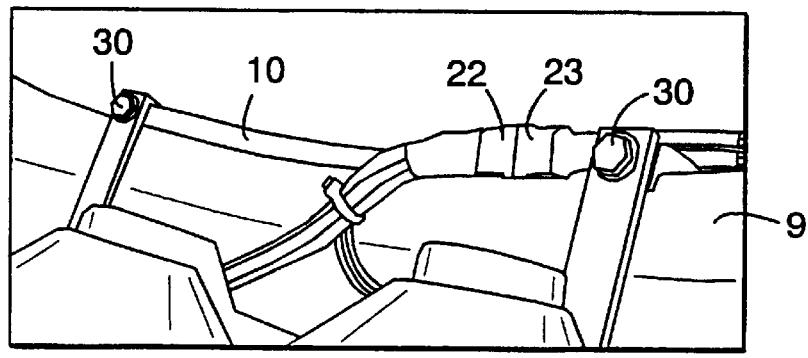
FIG. 6 shows the electric interconnection between the arrangement with special lights and the electric system of the car, the figure also showing the first type of holding means comprising conventional screw means.

As appears from FIGS. 3 and 6 all headlights 1–5 are electrically interconnected to the first part 22 of an electric connecting means, the second part 23 of which, which is intended to be connected with the first part is connected to the electric system of the car and is accordingly stationarily arranged in the car.

Figure 7:
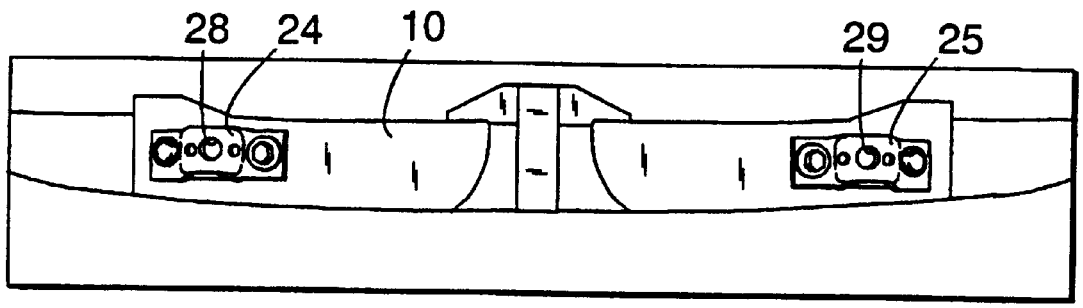
FIGS. 7, 8 show a modified type of holding means for use on the bumper/cross-beam of the vehicle.
Figure 8:
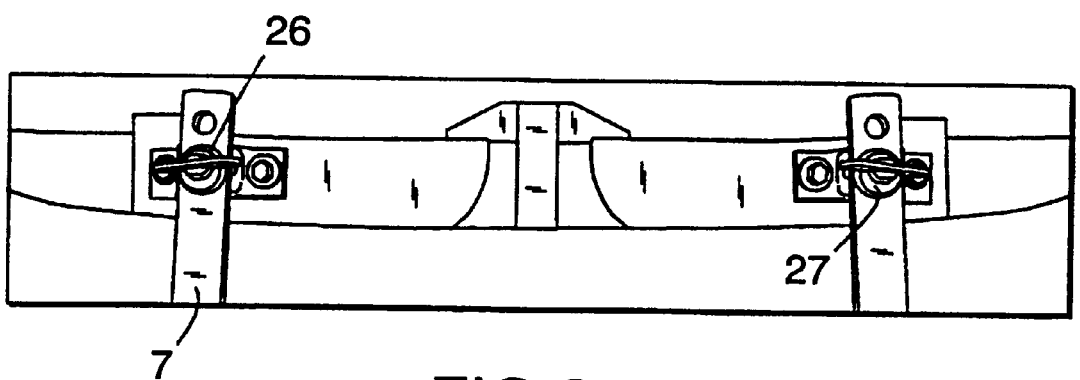

In FIGS. 7 and 8 is shown a modified type of means for holding the two rods 7, 8 on the bumper 9 of the car or on the cross-beam 10 arranged in connection with the bumper. These holding means comprise two holders 24, 25 provided with spring washers, which holders are fastened on the bumper/cross-beam by screws and are maintained stationarily in the car (see FIG. 7). The two rods 7, 8 of the arrangement with the special lights, as appears from FIG. 8, are intended to be projected into these two holders 24, 25, and each one of these two rods is fastened by locking by a thumb screw 26, 27, which screws are applied into respective hole 28, 29 of the holders 24, 25 and are simply and smoothly forced into locking position by turning a quarter of a revolution.

When mounting the arrangement with special lights according to the invention on the private car, the lower part of the stage 6 is fastened on the bumper 9/cross-beam 10 of the car by two screw means. Thereafter the first part 22 of the electric coupling means, which part belongs to the arrangement, is connected with the second part 23 of the coupling means, which part 23 is positioned in the front portion of the car. Finally the socket means 16 of the quick coupling means is connected with the ball coupling 17.

When demounting the arrangement with special light from the car, the first thing to do is to loosen the socket means 16 from the ball coupling 17, whereafter the first part 22 of the electric coupling means is loosened from the second part 23 which part is stationary in the car. Finally the screw means holding the two rods 7, 8 against the bumper/ cross-beam of the car are loosened, whereafter the arrangement can be lifted away.

From the above appears that it is very simple both to demount the arrangement with special lights from the car respectively to mount the arrangement on the car.

Another essential advantage is the stable fastening of the arrangement of the car. This has been achieved partly by the two fastening rods 7, 8 and partly by the two quick coupling means 13.

The invention is of course not limited to the herewith described and shown embodiment but can be modified within the scope of the following claims.

What is claimed is:

1. An arrangement with a plurality of special lights for a vehicle having a front part with a bumper and a bonnet with an integrated grill comprising a stage which is provided with at least two headlights, and which is detachably fastened to the front portion of the vehicle, said vehicle having a bonnet and a radiator grill, said arrangement comprising a first type of holding means which is fastenable to the front portion of the vehicle; and a second type of holding means in the form of a quick coupling means which has a first part and a second part which can be connected to each other, the first part being articulately fastened on the head lights and/or the stage and the second part co-operating with the first part, projecting outside the radiator grill and is fastened to the, or to the inside of the bonnet; and all headlights are electrically interconnected to an electric coupling means and to the electric system of the vehicle and is accordingly stationarily arranged in the vehicle whereby the arrangement can be connected or disconnected from the vehicle.

2. An arrangement according to claim 1, wherein said first part of the quick coupling means comprises an articulated portion which is directly or indirectly pivotally fastened on the headlights and/or the stage, and a rod part, said rod part at its end having a socket means, and said socket means being detachably connected to a ball coupling which is arranged on the second part of the quick coupling means.

3. An arrangement according to claim 1, wherein the first type of holding means comprises two bars and that each one of these bars is intended to be fastened on the bumper of the vehicle or the cross-beam by screw means.

4. An arrangement according to claim 3 wherein said first type of holding means comprises two thumb screws, each one of which is intended to co-operate with holders, said holders being provided with a spring washer for stationarily fastening on the bumper or crossbeam.

5. An arrangement with a plurality of special lights for a vehicle having a front part with a bumper and a bonnet with an integrated grill comprising a stage which is provided with at least two headlights, and which is detachably fastened to the front portion of the vehicle, said vehicle having a bonnet and a radiator grill, said arrangement comprising a first type of holding means which is fastenable to the front portion of the vehicle; and a second type of holding means in the form of a quick coupling means which has a first part and a second part which can be connected to each other, the first part being articulately fastened on the head lights and/or the stage and the second part cooperating with the first part, projecting outside the radiator grill and is fastened to the grill, or to the inside of the bonnet;

all headlights are electrically interconnected to an electric coupling means and to the electric system of the vehicle and is accordingly stationarily arranged in the vehicle whereby the arrangement can be connected or disconnected from the vehicle and said first part of the quick coupling means comprises an articulated portion which is directly or indirectly pivotally fastened on the headlights and/or the stage and a rod part, said rod part at its end having a socket means, and said socket means being detachably connected to a ball coupling which is arranged on the second part of the quick coupling means.

* * * * *